United States Patent Office 2,839,389
Patented June 17, 1958

2,839,389

RECOVERY OF GOLD FROM AQUEOUS CYANIDE SOLUTION

Norman Frank Kember, Walton-on-Thames, and John Aveston, Kingston-on-Thames, England, assignors to National Research Development Corporation, London, England, a corporation of Great Britain No Drawing. Application May 4, 1956
Serial No. 589,843

Claims priority, application Great Britain December 16, 1955

3 Claims. (Cl. 75—118)

This invention relates to the recovery of gold from aqueous cyanide solutions.

Aqueous solutions of gold obtained by the cyanide process for gold recovery usually contain thiocyanate. The present invention is based on the observation that improved adsorption of gold and silver takes place from such aqueous solutions containing thiocyanate when the anion exchange resin employed contains weakly basic groups together with a minor proportion of strongly basic groups. In accordance with the invention, recovery of the gold and silver is effected by bringing the cyanide solution into contact with an anion exchange resin which is predominantly weakly basic in character but which contains a minor proportion of strongly basic quaternary ammonium groups, for example from 6 to 10 percent.

Anion exchange resins which may be used are those prepared from cross-linked polystyrene which has been chloromethylated and treated with a primary or secondary amine. The following groups may be employed, the benzene ring being part of the cross-linked polystyrene.

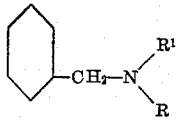

R, $R^1$ may be hydrogen, methyl, ethyl or the ethylenediamine group, R and $R^1$ being the same or different.

Satisfactory adsorption of the gold is obtained by the process of the invention in the presence of the highest concentration of thiocyanate ion which is normally encountered in pregnant liquors. The adsorbed cyano complexes may be eluted with more concentrated solutions of aqueous alkali thiocyanate or ammonium thiocyanate and gold and silver may be recovered from the eluent by electrolysis. The elution leaves the anion exchange resin in the thiocyanate form, in which form it is ready for re-use for further adsorption.

The following examples serve to illustrate the invention:

*Example 1.*—An aqueous cyanide solution of the following composition—

| | Parts per million |
|---|---|
| Gold | 6 |
| Nickel | 40 |
| Copper | 30 |
| Iron | 24 |

Excess sodium cyanide 0.15%.

was allowed to come to equilibrium with an anion exchange resin of the cross-linked polystyrene type containing 90% dimethylamine groups (i. e. R, $R^1$ in the formula given above were methyl groups) and 10% quaternary (strong base) groups. One gram of the resin at equilibrium absorbed 26 mgm. gold
12 mgm. nickel
0.5 mgm. iron
Copper was not detected When the same quantity of aqueous cyanide solution of the same composition was allowed to come to equilibrium with the same amount of an anion exchange resin containing the same basic groups but in the amounts of 98.5% dimethyl groups and 1.5% of the quaternary groups, the amounts of the metal absorbed per gram of resin were

| | Mg. |
|---|---|
| Gold | 17 |
| Nickel | 1.6 |
| Copper | 0.7 |
| Iron | 0.1 |

The same amount of aqueous cyanide solution of the same composition was allowed to come to equilibrium with the same amount of an anion exchange resin containing the same basic groups but in amounts 60% of dimethyl groups and 40 percent of the quaternary groups the amounts of the metals adsorbed were—

| | Mg. |
|---|---|
| Gold | 16.5 |
| Nickel | 45 |
| Copper | 8.5 |
| Iron | 14.8 |

The above results were all obtained with cyanide solutions free from thiocyanate ion. Under these conditions the resin with the lowest percentage of strong groups shows the highest selectivity for gold but if thiocyanate is present the amount of gold taken up by the resin at equilibrium is too small to be economic.

If the resin used contains a small proportion of strong base groups, a high selectivity against base metals is obtained together with an acceptable figure for equilibrium gold adsorption. This is shown in the following example.

*Example 2.*—An aqueous cyanide solution of the following composition:

| | Parts per million |
|---|---|
| Gold | 6 |
| Silver | 6 |
| Copper | 30 |
| Nickel | 40 |
| Cobalt | 25 |
| Iron | 26 |
| Sodium cyanide | 150 |
| Sodium thiocyanate | 160 | was allowed to come to equilibrium with an anion exchange resin having dimethyl amine groups at the majority of the exchange positions and 8.5 percent of strong base (quarternary) groups. At equilibrium one gramme of the resin adsorbed 17 mg. of gold, 2 mg. silver, 14 mg. of nickel, 1.4 mg. of copper, 0.7 mg. of iron and 3.0 mg. of cobalt.

The behaviour of any silver which may be present in the aqueous cyanide liquor affected the amounts of this cyanate and nickel in the liquor. In the presence of thiocyanate the adsorption of silver by the anion exchange resin is very similar to that of nickel. The affinity of the resin is of the same order for both metals and they will displace each other according to their relative concentrations.

Both silver and nickel may be satisfactorily recovered by first treating the gold bearing cyanide liquor with an anion exchange resin having mainly the groups

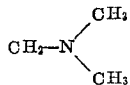

at the exchange positions and about 8 percent of strong base (quaternary) groups, in order to remove the gold and then treating the liquor with an anion exchange resin having some 60 percent of the groups

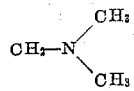

at the exchange positions and 40 percent of strong base (quaternary) groups to adsorb nickel and silver. The nickel and silver may then be recovered by elution with for example 2 M sodium thiocyanate. The silver may then be recovered from the eluate by electrodeposition. The nickel may be removed from the stripped eluate by making the solution slightly acid. The thiocyanate solution may then be neutralised and re-used.

In the absence of a large quantity of nickel and thiocyanate the behaviour of silver is similar to that of gold, and the metal may be recovered together with gold by adsorption on an anion exchange resin having principally the groups

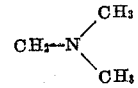

and about 8 percent of strong base groups at the exchange positions.

We claim:
1. A method of recovering gold from gold-bearing aqueous cyanide liquor containing the complex cyanide of a base metal of the class consisting of copper, iron and nickel, comprising treating the liquor with a cross-linked polystyrene anion exchange resin which is predominantly weakly basic in character but contains from 6% to 10% of strongly basic quaternary ammonium groups, and treating the resin and adsorbed gold with an eluting agent to recover gold from the resin.

2. A method according to claim 1, in which gold is recovered from the resin by elution with an aqueous solution of a thiocyanate selected from the class consisting of ammonium and alkali metal thiocyanates.

3. A method of recovering gold from gold-bearing aqueous cyanide liquid containing the complex cyanide of a base metal of the class consisting of copper, iron and nickel, comprising treating the liquor with a cross-linked polystyrene anion exchange resin which is predominantly weakly basic in character having at the majority of the exchange positions the group —$CH_2$—$NRR'$, where R and R' are selected from the class consisting of hydrogen, methyl, ethyl and ethylene diamine, and having at the minority of the exchange positions from 6.0 to 10 percent of quaternary ammonium groups, and treating the resin and adsorbed gold with an eluting agent to recover gold from the resin.

References Cited in the file of this patent
UNITED STATES PATENTS

| | | |
|---|---|---|
| 2,259,169 | Little | Oct. 14, 1941 |
| 2,304,637 | Hardy | Dec. 8, 1942 |

FOREIGN PATENTS

| | | |
|---|---|---|
| 162,910 | Australia | May 18, 1955 |